(12) United States Patent
Tagawa

(10) Patent No.: US 8,701,474 B2
(45) Date of Patent: Apr. 22, 2014

(54) AIR FLOW MEASURING DEVICE

(75) Inventor: Hiroshi Tagawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/540,765

(22) Filed: Jul. 3, 2012

(65) Prior Publication Data
US 2013/0008243 A1    Jan. 10, 2013

(30) Foreign Application Priority Data

Jul. 7, 2011 (JP) .................................. 2011-150665

(51) Int. Cl.
G01M 15/04 (2006.01)
(52) U.S. Cl.
USPC ................... 73/114.32; 73/204.21; 73/204.22
(58) Field of Classification Search
USPC .............................. 73/114.32, 204.21, 204.22
See application file for complete search history.

(56) References Cited

U.S. PATENT DOCUMENTS

| 7,089,788 | B2* | 8/2006 | Yonezawa ................. 73/114.32 |
| 7,654,134 | B2* | 2/2010 | Enomoto et al. .......... 73/114.32 |
| 7,661,303 | B2* | 2/2010 | Kohno et al. .............. 73/202.5 |
| 7,665,351 | B2* | 2/2010 | Kamiya ..................... 73/114.32 |
| 7,946,158 | B2* | 5/2011 | Enomoto et al. .......... 73/114.32 |
| 2008/0307867 | A1* | 12/2008 | Enomoto et al. ........ 73/114.32 |
| 2008/0307868 | A1* | 12/2008 | Kitahara ................... 73/114.32 |
| 2008/0307869 | A1* | 12/2008 | Kamiya .................... 73/114.32 |
| 2011/0296904 | A1* | 12/2011 | Tagawa et al. ............ 73/114.32 |
| 2013/0118242 | A1* | 5/2013 | Sudou ....................... 73/114.32 |

FOREIGN PATENT DOCUMENTS

JP        6-307906     11/1994
JP        B2-4150756    9/2008

OTHER PUBLICATIONS

Office Action (1 page) dated May 7, 2013, issued in corresponding Japanese Application No. 2011-150665 and English translation (2 pages).

* cited by examiner

Primary Examiner — Freddie Kirkland, III
(74) Attorney, Agent, or Firm — Nixon & Vanderhye P.C.

(57) ABSTRACT

An air flow measuring device includes a housing, a sensor, and a projection portion. The housing defines a bypass flow passage through which taken-in intake air passes and which has an outlet that opens into an intake passage toward a downstream side of a mainstream of intake air. The sensor is accommodated in the bypass flow passage to produce an electrical signal as a result of heat transfer between the taken-in intake air and the sensor. The projection portion is provided on an outer wall of the housing on a downstream side of the outlet in the mainstream and extends outward of the housing. A projection-portion projected region and an outlet projected region, which are formed respectively by projecting the projection portion and the outlet perpendicularly onto a projection plane that is perpendicular to a direction of the mainstream, overlap with each other.

3 Claims, 5 Drawing Sheets

UPSTREAM SIDE ←⎯⎯⎯⎯→ DOWNSTREAM SIDE
FLOW OF INTAKE AIR
MAINSTREAM

AIR FLOW MEASURING DEVICE

CROSS REFERENCE TO RELATED APPLICATION

This application is based on Japanese Patent Application No. 2011-150665 filed on Jul. 7, 2011, the disclosure of which is incorporated herein by reference.

TECHNICAL FIELD

The present disclosure relates to an air flow measuring device that measures a flow rate of air.

BACKGROUND

Conventionally, a thermal-type air flow measuring device for measuring an air flow rate by use of heat transfer from air is widely known. For example, the air flow measuring device is disposed in an intake passage of an internal combustion engine and used for measuring a flow rate of intake air suctioned into the engine (which can hereinafter be referred to as an intake air amount).

More specifically, this air flow measuring device takes in a part of an intake air mainstream flowing through the intake passage and generates an electrical signal in accordance with the intake air amount. The air flow measuring device includes a housing that defines a bypass flow passage through which the taken-in intake air flows, and a sensor that is accommodated in the bypass flow passage to produce the electrical signal as a result of heat transfer with the taken-in intake air. The air flow measuring device reduces the influence of turbulence of intake air mainstream in the intake passage by arranging the sensor in the bypass flow passage instead of disposing the sensor directly in the intake passage, through which the intake air mainstream passes, so as to output a measurement value with few variations.

In addition, pulsation is inevitably caused in the intake air mainstream in accordance with opening and closing of a valve of the engine. Accordingly, the intake air amount changes over time, fluctuating between a larger-side peak value of the pulsation and a smaller-side peak value of the pulsation. As a result, due to the thermal-type measuring method whereby the measured value is outputted using the heat transfer with air, the measured value is lower than a central value of the pulsation as a true value, and a negative-side error is thereby produced. Consequently, the air flow measuring device resolves the negative-side error of the measurement value by making longer a passage length of the bypass flow passage than a passage length when air flows straight through the intake passage without flowing through the bypass flow passage.

The pulsation of intake air tends to have a large amplitude along with, for example, the recent popularization of exhaust gas recirculation (EGR). When the amplitude of pulsation becomes large, a backward flow is periodically generated. When the intake air pulsation becomes great to such an extent that the backward flow is produced, if the sensor that cannot discern between the backward flow and forward flow is disposed, a detection is made on a positive-side for the backward flow as well. Thus, a positive-side error is caused. Even if the sensor that can distinguish between the backward flow and forward flow is disposed, the negative-side error becomes great. Therefore, the bypass flow passage having a longer passage length is required in order to eliminate the negative-side error.

Accordingly, an air flow measuring device, in which a structure for limiting a flow of the backward flow into the bypass flow passage is provided on a downstream side of an outlet of the bypass flow passage, is described in, for example, JP-A-H06-307906. However, in the air flow measuring device described in JP-A-H06-307906, the outlet of the bypass flow passage is parallel to the intake air mainstream, and a normal line of the outlet surface is perpendicular to the intake air mainstream. As a result, even though the intake air, which has passed through the bypass flow passage, flows out of the bypass flow passage through the outlet, it does not easily merge smoothly into the intake air mainstream. Furthermore, since the normal line of the outlet surface of the bypass flow passage is perpendicular to the intake air mainstream, in the vicinity of the outlet of the bypass flow passage, the flow of the intake air mainstream is locally bent by the flow out of the bypass flow passage, and a pressure drop of the intake air mainstream thereby becomes great.

Moreover, because the outlet of the bypass flow passage in JP-A-H06-307906 is parallel to the intake air mainstream, it primarily has a structure into which the backward flow does not easily enter, and entry of air due to the disturbance of the intake air mainstream is significant rather than the entry of the backward flow. For this reason, the air flow measuring device of JP-A-H06-307906 may have a large error because of the disturbance of the intake air mainstream. In addition, the air flow measuring device of JP-A-H06-307906 is a duct-integrated device, in which a pipe member that defines the intake passage, and a housing that defines the bypass flow passage are combined together. Accordingly, the device itself grows in size, and its dimensional tolerance increases, so that variation in performance is great among the products.

SUMMARY

According to the present disclosure, there is provided an air flow measuring device that is adapted to be disposed in an intake passage through which intake air drawn into an internal combustion engine flows and that is configured to take in a part of a mainstream of intake air and to produce an electrical signal in accordance with a flow rate of intake air. The device includes a housing, a sensor, and a projection portion. The housing defines a bypass flow passage through which the taken-in intake air passes and which has an outlet that opens into the intake passage toward a downstream side of the mainstream. The sensor is accommodated in the bypass flow passage to produce the electrical signal as a result of heat transfer between the taken-in intake air and the sensor. The projection portion is provided on an outer wall of the housing on a downstream side of the outlet in the mainstream and extends outward of the housing. A projection portion projected region and an outlet projected region, which are formed respectively by projecting the projection portion and the outlet perpendicularly onto a projection plane that is perpendicular to a direction of the mainstream, overlap with each other.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An air flow measuring device of an embodiment is adapted to be disposed in an intake passage through which intake air drawn into an internal combustion engine flows and is configured to take in a part of a mainstream of intake air and to produce an electrical signal in accordance with a flow rate of intake air. The device includes a housing, a sensor, and a projection portion. The housing defines a bypass flow passage through which the taken-in intake air passes and which has an outlet that opens into the intake passage toward a downstream side of the mainstream. The sensor is accommodated in the bypass flow passage to produce the electrical signal as a result of heat transfer between the taken-in intake air and the sensor. The projection portion is provided on an outer wall of the housing on a downstream side of the outlet in the mainstream and extends outward of the housing. A projection portion projected region and an outlet projected region, which are formed respectively by projecting the projection portion and the outlet perpendicularly onto a projection plane that is perpendicular to a direction of the mainstream, overlap with each other. The outlet projected region is included in the projection portion projected region. The projection portion includes an outlet opposed surface that is opposed to the outlet in the direction of the mainstream. The outlet opposed surface includes a flat surface or a curved surface, which spreads more outward further on the downstream side of the mainstream.

First Embodiment

Figure 1:
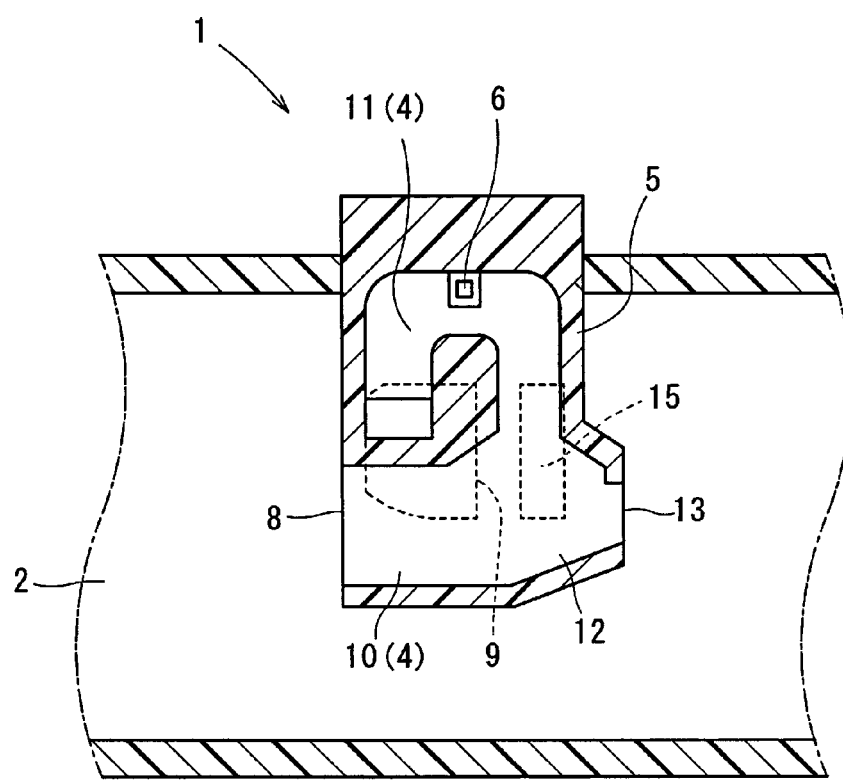
FIG. 1 is a sectional view illustrating an interior portion of an air flow measuring device in accordance with a first embodiment.

A configuration of an air flow measuring device 1 in accordance with a first embodiment will be described in reference to FIG. 1. The air flow measuring device 1 measures an air flow rate by means of heat transfer between the device 1 and air. For example, the air flow measuring device 1 is disposed in an intake passage 2 to an internal combustion engine (not shown) and used for measuring a flow rate of intake air suctioned into the engine (intake air amount).

More specifically, the air flow measuring device 1 is disposed in the intake passage 2 and takes in a part of an intake air mainstream and generates an electrical signal in accordance with the intake air amount. The air flow measuring device 1 includes a housing 5 that defines a bypass flow passage 4 through which the taken-in intake air flows, and a sensor chip 6 that is accommodated in the bypass flow passage 4 to produce the electrical signal as a result of heat transfer with the taken-in intake air. The electrical signal generated in the sensor chip 6 is outputted to an electronic control unit outside the air flow measuring device 1 through predetermined processing, to be used for, for example, various kinds of control processing such as fuel injection control.

The bypass flow passage 4 includes an inlet 8 for intake air that opens into the intake passage 2 toward an upstream side of the intake air mainstream, an outlet 9 for intake air that opens into the intake passage 2 toward a downstream side of the intake air mainstream, a straight passage 10 that extends linearly from the inlet 8 to make the intake air flow straight in the same direction as the intake air mainstream in the intake passage 2, and a circulation passage 11 that makes flow around the intake air flowing straight through the straight passage 10 to divert the air into the outlet 9. A dust discharge passage 12 for discharging dust is connected linearly to the straight passage 10. A downstream end of the dust discharge passage 12 serves as a dust discharge port 13 that opens into the intake passage 2 toward a downstream side of the intake air mainstream.

The sensor chip 6 projects at a position that is located on the most rear side of the circulation passage 11 and the farthest from the straight passage 10. The circulation passage 11 branches into two passages on the downstream side, and the two outlets 9 are thereby provided. In addition, at the position of the circulation passage 11 at which the sensor chip 6 is arranged, the flow of air is opposite from the flow in the straight passage 10 and the flow of the intake air mainstream in the intake passage 2.

As described above, the air flow measuring device 1 is not influenced directly by the turbulence of the intake air mainstream in the intake passage 2 by arranging the sensor chip 6 in the bypass flow passage 4 instead of disposing the sensor chip 6 directly in the intake passage 2, through which the intake air mainstream passes, so as to output the measurement value with few variations. Moreover, in the air flow measuring device 1, by providing, for example, the circulation passage 11, the passage length of the bypass flow passage 4 is made longer than a passage length in a case where the air is not taken into the bypass flow passage 4 and flows straight through the intake passage 2, so as to solve the reduction of measurement value caused by the intake air pulsation.

Figure 2A:
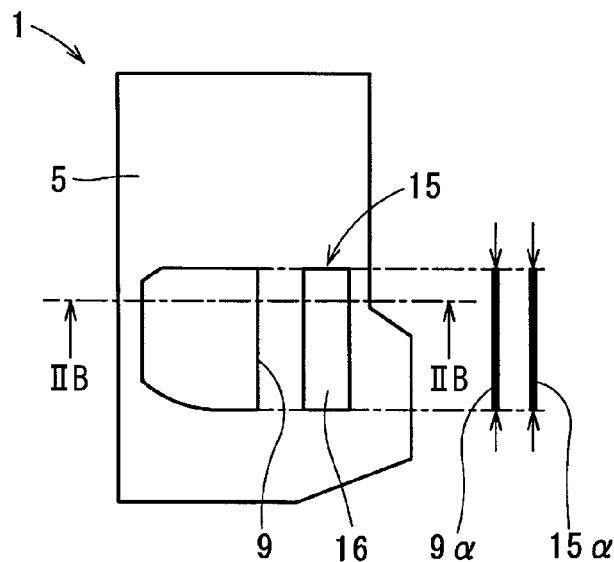
FIG. 2A is a side view illustrating the air flow measuring device of the first embodiment.
Figure 2B:
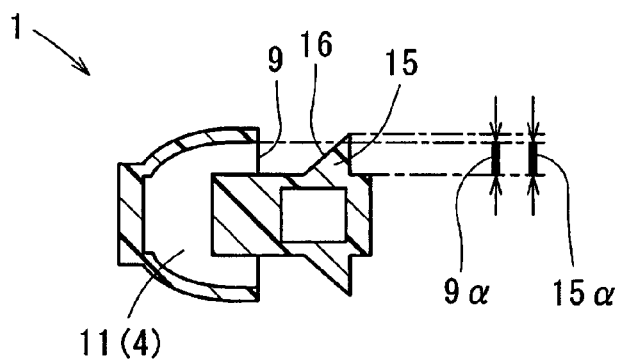
FIG. 2B is a cross-sectional view taken along a line IIB-IIB in FIG. 2A.
Figure 2C:
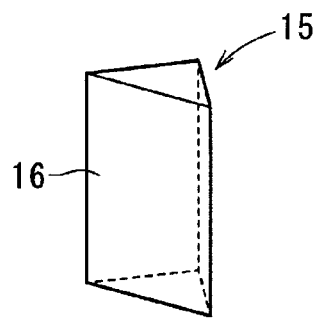
FIG. 2C is a perspective view illustrating a projection portion of the air flow measuring device of the first embodiment.
Figure 3A:
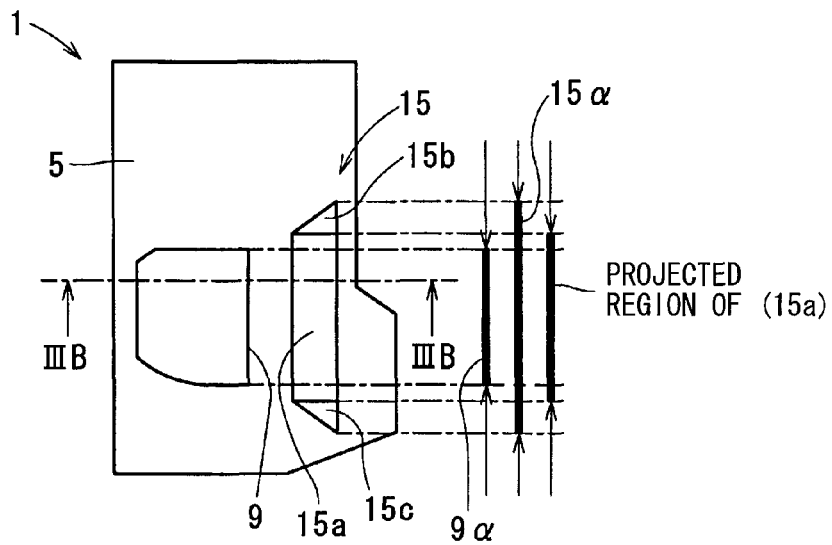
FIG. 3A is a side view illustrating an air flow measuring device in accordance with a second embodiment.
Figure 3B:
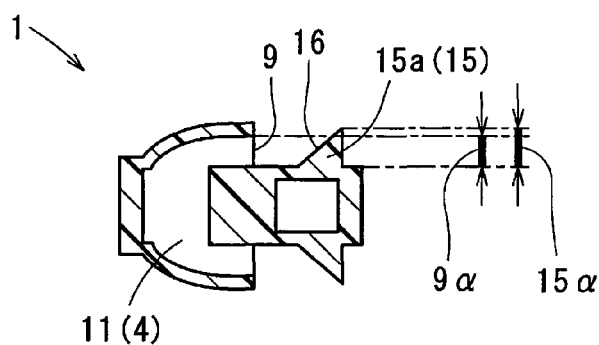
FIG. 3B is a cross-sectional view taken along a line IIIB-IIIB in FIG. 3A.
Figure 3C:
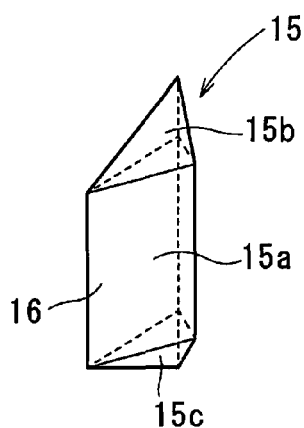
FIG. 3C is a perspective view illustrating a projection portion of the air flow measuring device of the second embodiment.
Figure 3D:
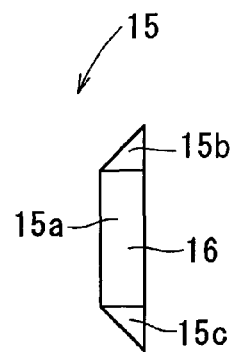
FIG. 3D is a rear view illustrating the projection portion of the second embodiment.

Characteristics and their effects of the air flow measuring device 1 of the first embodiment will be described below in reference to FIGS. 1 to 2C. In the air flow measuring device 1, the outlet 9 of the bypass flow passage 4 opens into the intake passage 2 toward the downstream side of the intake air mainstream. Furthermore, a projection portion 15 extending outward on the downstream side of the outlet 9 in the intake air mainstream is provided on an outer wall of the housing 5. The projection portion 15 is formed in the shape of a triangular prism having a right-angled triangle in cross-section.

On the assumption that the projection portion 15 and the outlet 9 are respectively projected perpendicularly onto a projection plane that is perpendicular to the direction of the intake air mainstream, and that a projection portion projected region 15α and an outlet projected region 9α are thereby formed, the outlet projected region 9α is included in the projection portion projected region 15α.

Accordingly, first, the outlet 9 of the bypass flow passage 4 is non-parallel to the intake air mainstream. Therefore, the problems caused in the case of the outlet 9 being provided parallel to the intake air mainstream can be solved. Secondly, although the entry of a backward flow into the bypass flow passage 4 is facilitated since the outlet 9 is non-parallel to the intake air mainstream, the entry of the backward flow into the bypass flow passage 4 can be limited by providing the projection portion 15 such that the projection portion projected region 15α includes the outlet projected region 9α.

Thus, in the air flow measuring device 1, the problems caused in the case of the outlet 9 of the bypass flow passage 4 being provided parallel to the intake air mainstream can be resolved. Also, the entry of the backward flow into the bypass flow passage 4 due to the intake air pulsation can be limited.

In addition, because the projection portion projected region 15α includes the outlet projected region 9α, the outlet 9 of the bypass flow passage 4 is covered entirely by the projection portion 15 on its downstream side. For this reason, the effect of limiting the entry of the backward flow by the projection portion 15 is extremely high.

The projection portion 15 includes an outlet opposed surface 16 that is opposed to the outlet 9 in the direction of the intake air mainstream. The outlet opposed surface 16 is a flat surface that spreads more outward further on the downstream side of the intake air mainstream. Accordingly, a flow of air which has flowed out of the outlet 9 through the bypass flow passage 4 is made to follow the outlet opposed surface 16, so as to merge smoothly with the intake air mainstream.

Second Embodiment

In an air flow measuring device 1 in accordance with a second embodiment, as illustrated in FIGS. 3A to 3D, a projection portion 15 includes a portion 15a formed in the shape of a triangular prism having a right-angled triangle in cross-section, and portions 15b, 15c formed like triangular pyramids which are provided symmetrically at both ends of the portion 15a in its longitudinal direction. Given a projection portion projected region 15α and an outlet projected region 9α, the outlet projected region 9α is included in the projection portion projected region 15α. More specifically, the outlet projected region 9α is included in an area of the projection portion projected region 15α onto which the portion 15a is projected.

Modifications of the above embodiments will be described. The mode of the air flow measuring device 1 is not limited to the above-described embodiments, and various modifications may be made to the mode of the device 1. For example, in the air flow measuring device 1 of the embodiments, the outlet projected region 9α is included in the projection portion projected region 15α. Alternatively, instead of the outlet projected region 9α being completely included in the projection portion projected region 15α, the outlet 9 and the projection portion 15 may be provided such that the outlet projected region 9α and the projection portion projected region 15α overlap with each other, in order that a part of the outlet projected region 9α can be included in the projection portion projected region 15α.

Figure 4A:
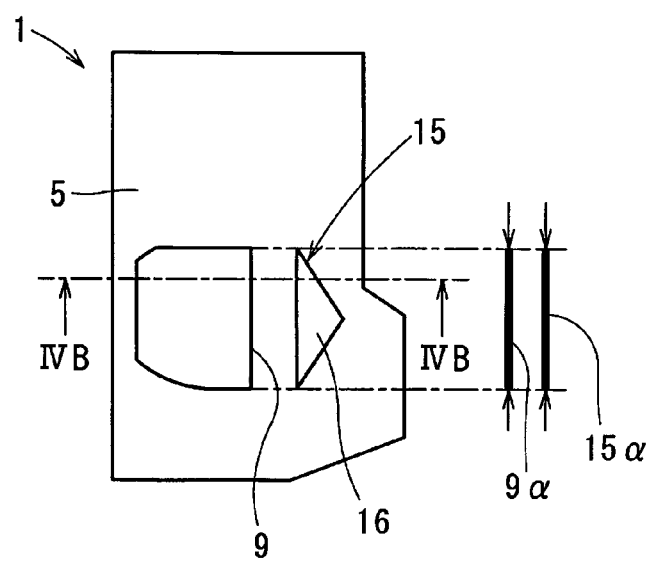
FIG. 4A is a side view illustrating an air flow measuring device in accordance with a modification.
Figure 4B:
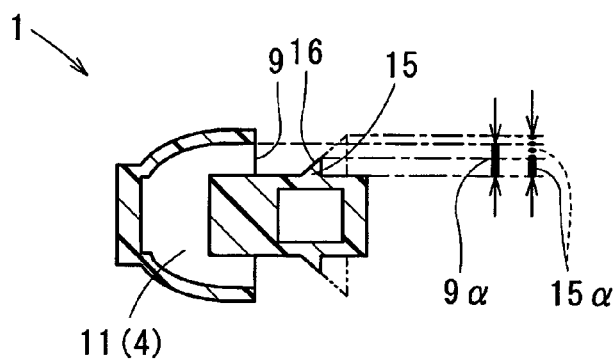
FIG. 4B is a cross-sectional view taken along a line IVB-IVB in FIG. 4A.
Figure 4C:
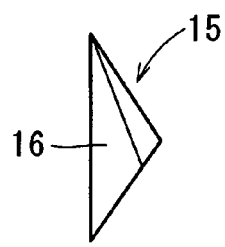
FIG. 4C is a perspective view illustrating a projection portion of the air flow measuring device of the modification.
Figure 5A:
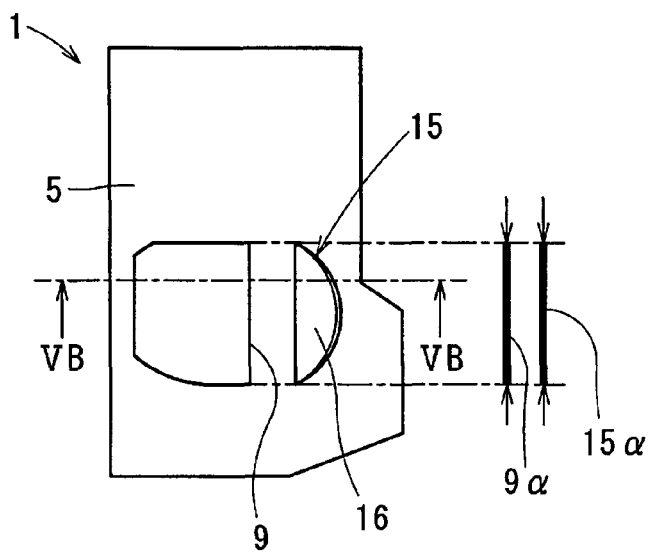
FIG. 5A is a side view illustrating an air flow measuring device in accordance with a modification.
Figure 5B:
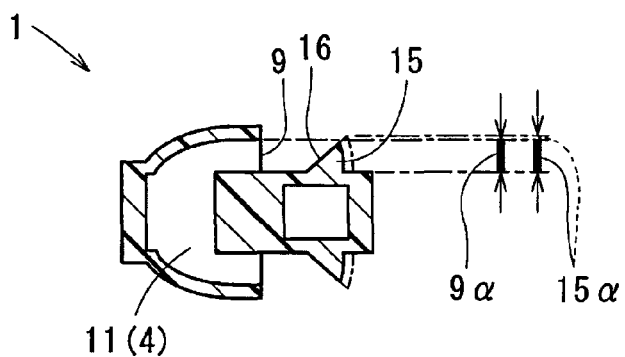
FIG. 5B is a cross-sectional view taken along a line VB-VB in FIG. 5A.
Figure 5C:
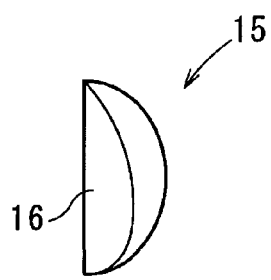
FIG. 5C is a perspective view illustrating a projection portion of the air flow measuring device of the modification.

More specifically, as illustrated in FIGS. 4A to 4C, the projection portion 15 may be formed into the shape of a triangular pyramid so that the outlet projected region 9α and the projection portion projected region 15α overlap with each other. As illustrated in FIGS. 5A to 5C, the projection portion 15 may be formed into a shape that generally conforms with a part of a sphere so that the outlet projected region 9α and the projection portion projected region 15α overlap with each other.

In the air flow measuring device 1 of the embodiments, the outlet opposed surface 16 is a flat surface. Alternatively, the outlet opposed surface 16 may be formed as a curved surface. Furthermore, the surface 16 may be formed as a combination of a curved surface and flat surface, or the surface 16 may be formed as a combination of different flat surfaces. Additionally, in the air flow measuring device 1 of the embodiments, a sensor for detection of the intake air amount is configured using the sensor chip 6. However, instead of the sensor chip 6, the sensor may be configured for example, using a bobbin obtained by winding a platinum wire.

To sum up, the air flow measuring device 1 of the above embodiments can be described as follows.

An air flow measuring device 1 is adapted to be disposed in an intake passage 2 through which intake air drawn into an internal combustion engine flows, and is configured to take in a part of a mainstream of intake air and to produce an electrical signal in accordance with a flow rate of intake air. The device 1 includes a housing 5, a sensor 6, and a projection portion 15. The housing 5 defines a bypass flow passage 4 through which the taken-in intake air passes and which has an outlet 9 that opens into the intake passage 2 toward a downstream side of the mainstream. The sensor 6 is accommodated in the bypass flow passage 4 to produce the electrical signal as a result of heat transfer between the taken-in intake air and the sensor 6. The projection portion 15 is provided on an outer wall of the housing 5 on a downstream side of the outlet 9 in the mainstream and extends outward of the housing 5. A projection portion projected region 15α and an outlet projected region 9α, which are formed respectively by projecting the projection portion 15 and the outlet 9 perpendicularly onto a projection plane that is perpendicular to a direction of the mainstream, overlap with each other.

By providing the outlet 9 of the bypass flow passage 4 to open into the intake passage 2 toward the downstream side of the mainstream, the problems caused by the outlet 9 of the bypass flow passage 4 being parallel to the intake air mainstream can be solved. By making the outlet 9 of the bypass flow passage 4 open toward the downstream side of the mainstream, the entry of the backward flow into the bypass flow passage 4 is facilitated. Nevertheless, by providing the projection portion 15 on the outer wall of the housing 5 on the downstream side of the outlet 9 in the mainstream, and furthermore, by forming the projection portion 15 such that the projection portion projected region 15α and the outlet projected region 9α overlap with each other, the entry of the backward flow into the bypass flow passage 4 can be limited.

Thus, in the air flow measuring device 1, the problems caused by the outlet 9 of the bypass flow passage 4 being parallel to the intake air mainstream can be resolved. Also, the entry of the backward flow into the bypass flow passage 4 due to the intake air pulsation can be limited.

The outlet projected region 9α may be included in the projection portion projected region 15α. Accordingly, the outlet 9 of the bypass flow passage 4 is covered entirely by the projection portion 15 on its downstream side. Therefore, the effect of limiting the entry of the backward flow can be further enhanced.

The projection portion 15 may include an outlet opposed surface 16 that is opposed to the outlet 9 in the direction of the mainstream. The outlet opposed surface 16 includes a flat surface or a curved surface, which spreads more outward further on the downstream side of the mainstream. Accordingly, a flow of air which has flowed out of the outlet 9 through the bypass flow passage 4 is made to follow 16, so as to merge smoothly with the intake air mainstream.

Additional advantages and modifications will readily occur to those skilled in the art. The invention in its broader terms is therefore not limited to the specific details, representative apparatus, and illustrative examples shown and described.

What is claimed is:

1. An air flow measuring device that is adapted to be disposed in an intake passage through which intake air drawn into an internal combustion engine flows and that is configured to take in a part of a mainstream of intake air and to produce an electrical signal in accordance with a flow rate of intake air, the device comprising:
    a housing that defines a bypass flow passage through which the taken-in intake air passes and which includes a sensor passage having an outlet that opens into the intake passage toward a downstream side of the mainstream;
    a sensor that is accommodated in the sensor passage to produce the electrical signal as a result of heat transfer between the taken-in intake air and the sensor; and
    a projection portion that is provided on an outer wall of the housing on a downstream side of the outlet in the mainstream and extends outward of the housing, wherein a projection portion projected region and an outlet projected region, which are formed respectively by projecting the projection portion and the outlet perpendicularly onto a projection plane that is perpendicular to a direction of the mainstream, overlap with each other.

2. The air flow measuring device according to claim 1, wherein the outlet projected region is included in the projection portion projected region.

3. The air flow measuring device according to claim 1, wherein:
    the projection portion includes an outlet opposed surface that is opposed to the outlet in the direction of the mainstream; and
    the outlet opposed surface includes a flat surface or a curved surface, which spreads more outward further on the downstream side of the mainstream.

* * * * *